United States Patent
Martynov et al.

(10) Patent No.: US 11,429,635 B2
(45) Date of Patent: Aug. 30, 2022

(54) MAINTENANCE EVENTS IN A DATA REPLICATION SYSTEM

(71) Applicant: SAP SE, Walldorf (DE)

(72) Inventors: Andrey Martynov, Bad Schoenborn (DE); Michael Haberkorn, Bad Schoenborn (DE); Sebastian Haase, Kronau (DE)

(73) Assignee: SAP SE, Walldorf (DE)

( * ) Notice: Subject to any disclaimer, the term of this patent is extended or adjusted under 35 U.S.C. 154(b) by 207 days.

(21) Appl. No.: 16/860,257

(22) Filed: Apr. 28, 2020

(65) Prior Publication Data

US 2021/0334290 A1    Oct. 28, 2021

(51) Int. Cl.
*G06F 16/27* (2019.01)
(52) U.S. Cl.
CPC .................... *G06F 16/27* (2019.01)
(58) Field of Classification Search
CPC ........................................ G06F 16/17
USPC ........................................ 707/634
See application file for complete search history.

(56) References Cited

U.S. PATENT DOCUMENTS

| | | | |
|---|---|---|---|
| 2010/0030730 A1* | 2/2010 | Shang | G06F 16/27 707/637 |
| 2012/0005160 A1* | 1/2012 | Naicken | G06F 16/28 707/627 |
| 2013/0173547 A1* | 7/2013 | Cline | G06F 16/178 707/638 |

\* cited by examiner

*Primary Examiner* — Michael Pham
(74) *Attorney, Agent, or Firm* — Buckley, Maschoff & Talwalkar LLC

(57) ABSTRACT

Systems and methods include detection of changes to data of a plurality of source objects of a source system, replicating the data changes to corresponding ones of the plurality of target objects, and, during the detection of changes to data and the replication of the data changes: detecting a first change to a first source object, identifying a first maintenance event based on the detected first change; determining a first one or more solutions to resolve the first maintenance event; presenting the first maintenance event and the first one or more solutions to resolve the first maintenance event to a user; receiving an indication from the user of a first solution of the first one or more solutions to resolve the first maintenance event; and, in response to the indication, executing the first solution.

20 Claims, 10 Drawing Sheets

MAINTENANCE EVENTS IN A DATA REPLICATION SYSTEM

BACKGROUND

Conventional database systems store large volumes of data related to many aspects of an enterprise. It is often desirable to mirror a portion of the data stored in one system (i.e., a source system) within another system (i.e., a target system). For example, it may be desirable to mirror a portion of data stored in a source system which is particularly suited for data acquisition and storage within a target system which is particularly suited for data analysis.

A replication server may be used to create and update a target object (e.g., a target table) in a target system which mirrors a source object (e.g., a source table) in a source system. Such a replication server may reactively apply changes in the source table to the target table. A user of the target system may utilize the data of the target table while such replication is active.

Data replication may be adversely affected by certain changes to a source object. For example, if a field is added to a source table in a source system, data of that field will not be replicated to the target system until a new target table is created including the new field and the data of the source table is loaded into the new target table. Similarly, if a key field of a source table changes, replication systems which rely on such key fields to detect data changes will no longer replicate any changes to a corresponding target table.

Conventional systems handle these types of changes by automatically performing remedial actions. Such actions may include, as described above, stopping replication, creating a new target table and re-loading data all of the source table data into the new target table. Accordingly, the remedial actions can be quite disruptive to a user of the target system.

Systems are desired to efficiently configure and control the remedial actions of a replication server in response to certain events.

DETAILED DESCRIPTION

The following description is provided to enable any person in the art to make and use the described embodiments. Various modifications, however, will remain readily-apparent to those in the art.

Generally, embodiments may detect events associated with a source object in a replication system, and determine actions to be performed based on the object type and/or event type. The determination may be based on client-defined configuration data. Actions may include, for example, resolving the event automatically, resolving the event automatically and notifying a user, prompting the user for authorization to resolve or ignore the event, prompting the user to select one of several resolution actions, ignoring the event, and ignoring the event and notifying the user of the event.

Figure 1:
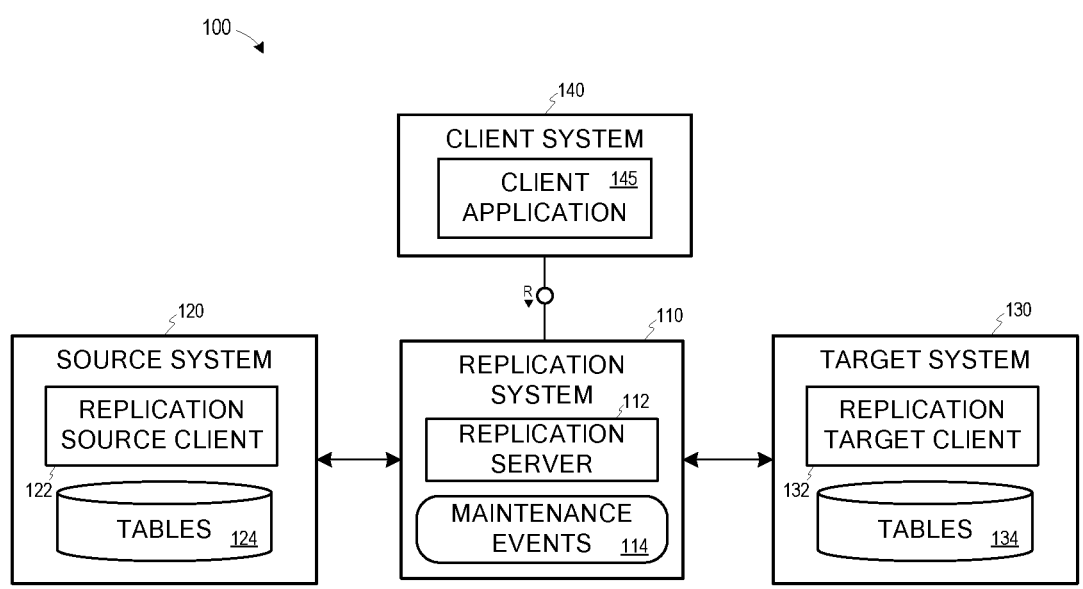
FIG. 1 is a replication architecture according to some embodiments.

FIG. 1 illustrates system 100 according to some embodiments. System 100 includes replication system 110 for replicating data from source system 120 into target system 130. Generally, replication system 110 may execute replication server 112 based on configuration data to maintain a replica of one or more tables 124 of source system 120 in tables 134 of target system 130. The configuration data may specify particular objects, or tables, of a particular source system to be replicated in one or more particular target systems. Accordingly, although FIG. 1 illustrates only one source system and one target system, in some embodiments replication system 110 may replicate data from one or more source systems to one or more target systems.

Source system 120 may execute replication source client 122 to record changes to configuration-specified ones of tables 124 and provide the changes to replication server 112. Such changes may be recorded using database triggers and logging tables as is known in the art. Replication server 112 may check for changes and provide any changes to appropriate ones of tables 134 via replication target client 132.

While checking for changes, replication server 112 may detect events, hereinafter referred to as maintenance events, which may require execution of one or more remedial actions. For example, replication server 112 may determine that a field has been added to a source table, or that the key field of a source table has changed. In the former case, and absent any intervention, data of the added field would not be replicated in the corresponding target table. In the latter case, the database triggers associated with the source table would no longer log changes to the source table, thereby halting data replication with respect to the source table.

Conventionally, in response to the above events, replication server 112 would simply re-load the entire source object to ensure that a correct copy is maintained in target system 130. However, according to some embodiments, replication server 112 stores data 114 describing detected maintenance events and determines actions to be performed in response to the maintenance events based on the event type and/or source object type.

As mentioned above, the actions may include resolving the event automatically, resolving the event automatically and notifying a user, prompting the user for authorization to resolve or ignore the event, prompting the user to select one of several resolution actions, ignoring the event, and ignoring the event and notifying the user of the event.

Client device system 140 executes client application 145 to communicate with replication system 110. Client application 145 may comprise code executing within a Web browser executed by client system 140 according to some embodiments. Client application 145 may communicate with replication server 112 to receive maintenance events 114 and to provide user instructions to replication server 112 for handling the events. Whether or not a user is presented with an event and/or options for handling the event may be based on the event type and/or source object type as will be described below.

The data stored within tables 124 and tables 134 may comprise one or more of conventional tabular data, row-based data, column-based data, and object-based data. According to some embodiments, replication server 112 operates to perform any transformations necessary to convert data from a format of tables 124 to a format of tables 134. The data may be distributed among several relational databases, dimensional databases, and/or other data sources.

Each of source system 120 and target system 130 may comprise any computing system capable of executing a database management system, of storing and independently managing data of one or more tenants and, in some embodiments, of supporting the execution of database server applications. Each of source system 120 and target system 130 may include a distributed storage system and/or distributed server nodes for performing computing operations as is known in the art. According to some embodiments, source system 120 is a data warehousing system and target system 130 is an in-memory database system configured to provide data analytics, but embodiments are not limited thereto. A client application (not shown) may communicate with one or more server applications (not shown) executing on target system 130 to perform data analytics on data stored in tables 134.

Source system 120 or target system 130 may implement an in-memory database, in which a full database is stored in volatile (e.g., non-disk-based) memory (e.g., Random Access Memory). The full database may be persisted in and/or backed up to fixed disks (not shown). Embodiments are not limited to in-memory implementations. For example, source system 120 or target system 130 may store data in Random Access Memory (e.g., cache memory for storing recently-used data) and one or more fixed disks (e.g., persistent memory for storing their respective portions of the full database).

Figure 2:
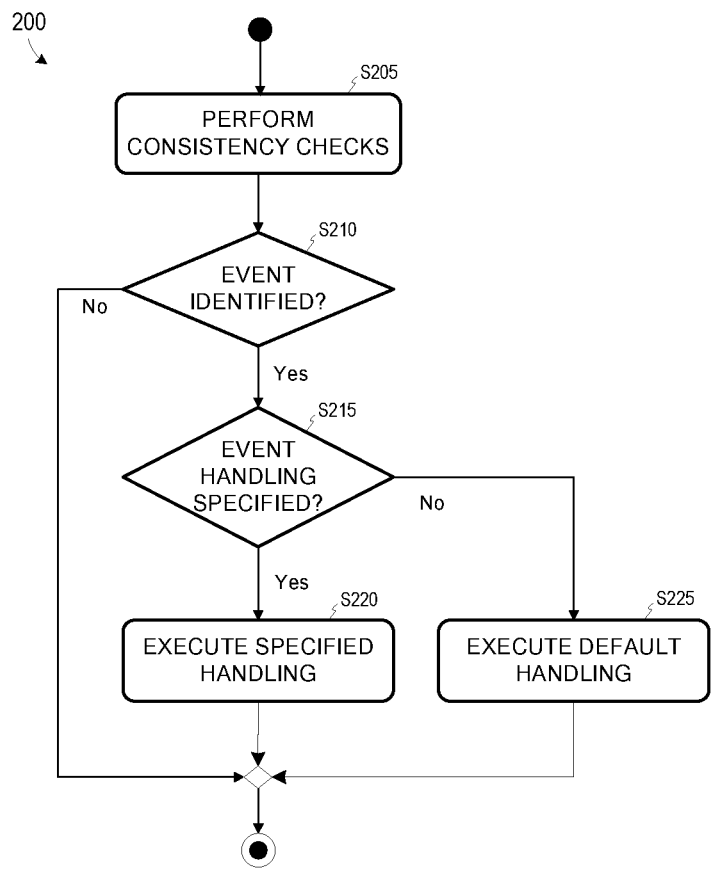
FIG. 2 is a flow diagram of a process to handle maintenance events according to some embodiments.

FIG. 2 illustrates process 200 to handle detected maintenance events according to some embodiments. Process 200 will be described with respect to the example of FIG. 1 but embodiments are not limited thereto.

Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

According to some embodiments, replication server 112 may execute process 200 continuously during data replication. Initially, flow cycles between S205 and S210 to perform consistency checks during replication until an event is identified. The consistency checks may identify, based on logged changes within source system 120, whether changes, or events, have occurred to source objects which may require remedial action. The source objects may include database tables as well as any type of database views that are known in the art. The identified events are typically different from Create, Update, and Delete modifications to records of a source object, which are simply replicated according to the conventional processes.

Flow proceeds from S210 to S215 once an event is identified. At S215, it is determined whether an event handling has been specified for the identified event. As will be described in detail below, particular event handling may be specified for particular event types and/or particular source objects. If event handling has been specified, the specified handling is executed at S220. The specified handling may include, but is not limited to, resolving the event automatically, resolving the event automatically and notifying a user, prompting the user for authorization to resolve or ignore the event, prompting the user to select one of several resolution actions, ignoring the event, and ignoring the event and notifying the user of the event.

For example, if the identified event is a change to the structure of a source table, the event may be resolved automatically by reloading the source table into the target system, and the user may be notified of the event and resolution. In another example, the user is notified of the event (i.e., a change to the structure of a source table) and is given the option to reload the source table, to ignore the event, or to reload the source table at a later time.

If it is determined at S215 that no event handling is specified for the identified event, default handling is executed at S225. Default handling at S225 may comprise immediate resolution of all identified events without user notification, but embodiments are not limited thereto. Flow returns from S220 and S225 to S205.

Figure 3:
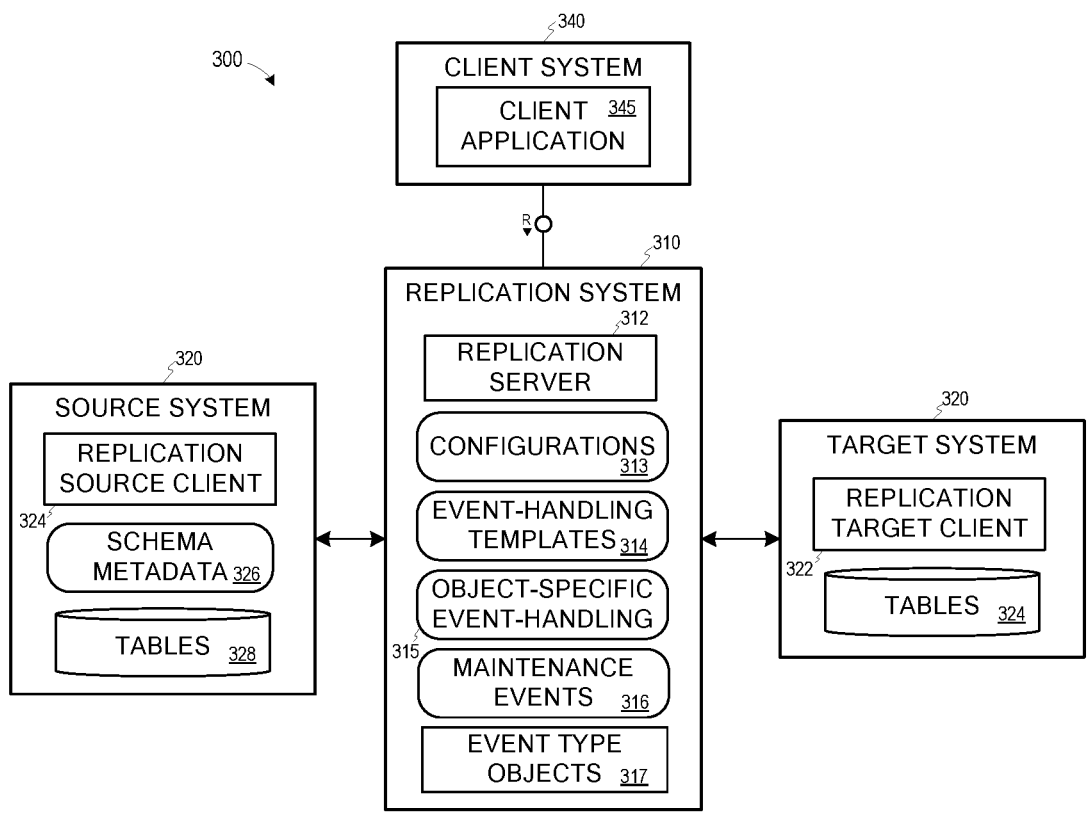
FIG. 3 is a replication architecture for configuring and controlling the handling of maintenance events according to some embodiments.

FIG. 3 illustrates system 300 according to some embodiments. System 300 may comprise an implementation of system 100 but embodiments are not limited thereto.

Replication system 310 operates to replicate data from source system 320 into target system 330. More specifically, replication server 312 executes based on configurations 313 to replicate data from source system 320 into target system 330. Configurations 313 may include one or more configurations, each of which specifies a source system, a target system, objects of the source system to be replicated in the target system, and additional object-specific parameters which govern replication of the objects.

Replication system 310 also stores event-handling templates 314 and object-specific event handling data 315. Each of event-handling templates 314 may indicate a particular default action for each of one or more event types. An event-handling template 314 may be associated with one or more configurations 313, in order to efficiently assign a set of default actions to particular event types for the associated one or more configurations 313.

Figure 4:
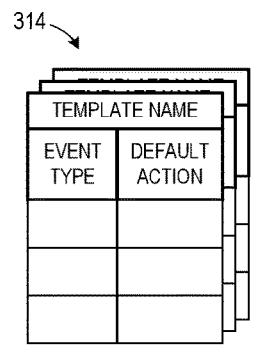
FIG. 4 shows tabular representations of template data structures to define default actions for various event types according to some embodiments.

FIG. 4 depicts tabular representations of event-handling templates 315 according to some embodiments. Each template 314 is associated with a name (or other identifier) and several event type/default action pairs. In operation, if a given event-handling template 314 is assigned to a given configuration 313, the given event-handling template 314 is used to determine a default action to perform in response to an event which is detected during replication based on the given configuration 313.

Figure 5:
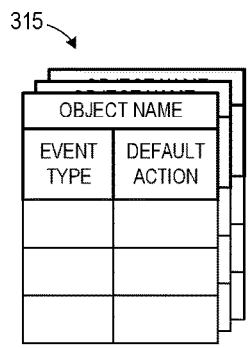
FIG. 5 shows tabular representations of data structures to define default actions for various object-specific event types according to some embodiments.

Object-specific event-handling data 315 may indicate, for particular data objects, a default action to be performed for each of one or more event types. FIG. 5 depicts tabular representations of object-specific event-handling data 315 according to some embodiments. Each data set 315 is associated with a source object and one or more event type/default action pairs. If an event is detected with respect to a given source object during replication based on a particular configuration 313, a default action may be determined based on object-specific event-handling data 315 associated with the object and the particular configuration 313. Determination of a default action based on event-handling templates 314 and object-specific event handling data 315 according to some embodiments will be described below.

Figure 6:
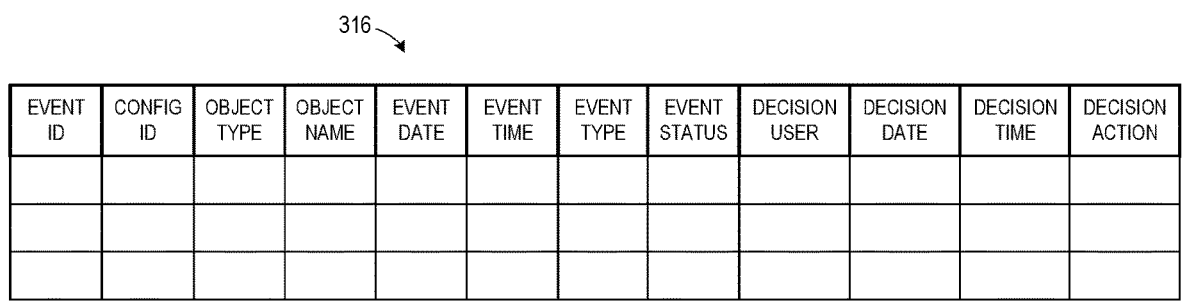
FIG. 6 is a tabular representation of maintenance event records according to some embodiments.

Replication system 310 also records maintenance events 316. Maintenance events 316 may be presented to client application 345, and the status and resolution thereof may also be recorded. FIG. 6 is a tabular representation of records of maintenance events 316 according to some embodiments.

Each record of maintenance events 316 of FIG. 6 includes an event identifier which uniquely identifies the event to which the record relates, and an identifier of the configuration in which the event was detected. Also included are the name and type of the source object to which the event relates, the date and time of the event occurrence date, the event type, and an event status.

The status of a particular event of events 316 may evolve over time. Possible statuses according to some embodiments include New, In Process, Completed, Obsolete, Error and Scheduled. The New status refers to the initial state of an event, at which the event has not been processed (i.e., no resolving actions have been performed with respect to the event) and resolution of the event awaits a (manual or automatic) decision. The In Process status indicates that a solution for an event has been selected and the event is currently being processed per the solution (e.g., a reload of a source table is in progress). A status of Complete indicates that the event has been successfully processed, and a status of Error indicates that an error occurred during processing.

The status of an event may be marked as Obsolete if the event has not been processed but processing is no longer necessary. For example, a change to a source table structure may result in identification of an event. If the source table structure is changed back to its prior state prior to processing of the event, the event is maintained in table 316 and marked as Obsolete.

The Scheduled status indicates that processing of the event is scheduled but has not yet begun. In one example, the event may be the consequence of another event, and processing of the event cannot occur until the other event is first processed.

Maintenance events 316 also store information related to decisions associated with the processing of each event. The information includes an identifier of a user who provided a decision regarding processing of an event, a date and time of the decision, and a Decision Action value which indicates how the decision was made. Values of the Decision Action field may include Manual (i.e., the user made the decision), Automated (i.e., the decision was made automatically, for example in view of pre-configured event handling instructions), and Closed Automatically (i.e., no solution was executed because event status is Obsolete).

Each event type may be implemented by a corresponding event type object 317 which includes a resolve method and a validate method. The resolve method may implement an algorithm to automatically resolve the issue represented by the event. The method may receive a "solution code" parameter which allows the method to implement several solutions for a single event type. As will be described below, if multiple solutions for a given event type exist, a user may choose a solution to execute. Alternatively, in automatic mode, a default solution is executed.

The validate method checks whether the state which raised the event is still present. If not, the event is assigned the status Obsolete. According to some embodiments, events having the status New are validated periodically as part of a health check. If an event is not processed within a specified time frame, the validate method may trigger an e-mail to the user including information associated with events which have not been processed.

Figure 7:
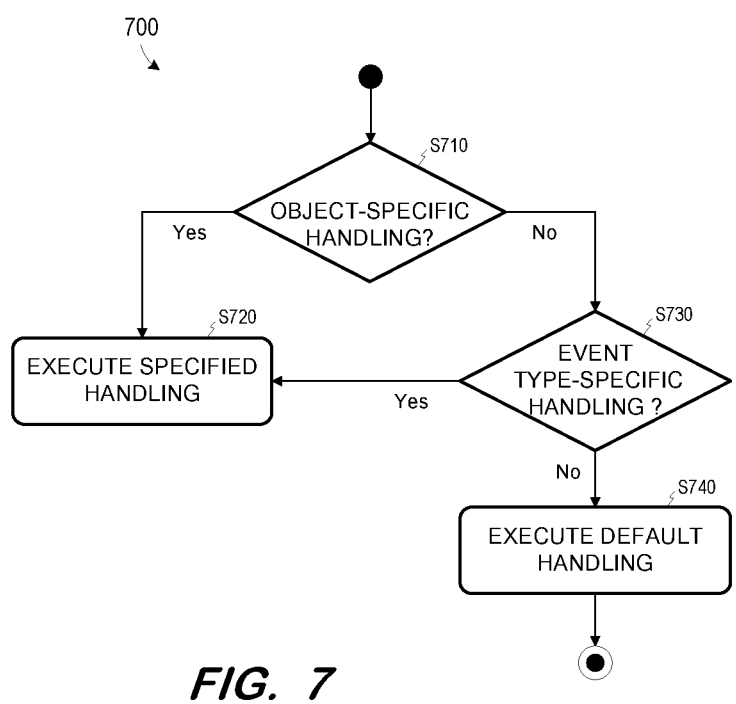
FIG. 7 is a flow diagram of a process to handle maintenance events in view of object-specific and event-specific configuration data according to some embodiments.

FIG. 7 is a flow diagram of process 700 to illustrate processing of an event in view of event handling templates 314 and object-specific event handling 315 according to some embodiments. Generally, according to the embodiment of process 700, any applicable object-specific handling for the given event type is afforded the highest priority, followed by any handling specified by a template for the given configuration and event type. Barring any such customizing, a default action is performed.

Flow proceeds to S710 once it is determined to process an event. As described above, the event is associated with a source object and an event type. At S710, it is determined whether any object-specific handling has been associated with the event type. For example, S710 may comprise reviewing object-specific event handling 315 to determine whether the source object of the event is associated with any object-specific handling, and whether this handling includes handling associated with the current event type. If so, flow proceeds to S720 to execute the object-specific handling associated with the current event type. Execution of the handling may, as described above, be automatic or manual (i.e., requiring user pre-approval).

Flow proceeds from S710 to S730 if it is determined that the source object of the event is not associated with any object-specific handling, or whether object-specific handling associated with the source object does not include handling associated with the current event type. At S730, it is determined whether the current configuration is associated with a template 314 specifying handling for the current event type. If so, the specified handling is executed at S720.

If the current configuration is not associated with a template 314 specifying handling for the current event type, flow proceeds to S740 to execute default handling for the current event type. The default handling and corresponding methods may be specified in the event type object 317 associated with the current event type.

Figure 8:
FIG. 8 shows a user interface to display maintenance events and receive user actions corresponding thereto according to some embodiments.

FIG. 8 is a view of user interface 800 which may be presented to a user according to some embodiments. User interface 800 presents maintenance events to the user and allows the user to specify processing of the presented maintenance events. User interface 800 may be presented by client application 345 executing within client system 340 according to some embodiments.

As shown, for each of the four listed events, user interface 800 shows the name and type of the associated source object, the event type, a description of the event, and the event date and time. The Action field includes links usable to initiate (or indicate a choice not to initiate) processing of a solution to the associated event.

Figure 9:
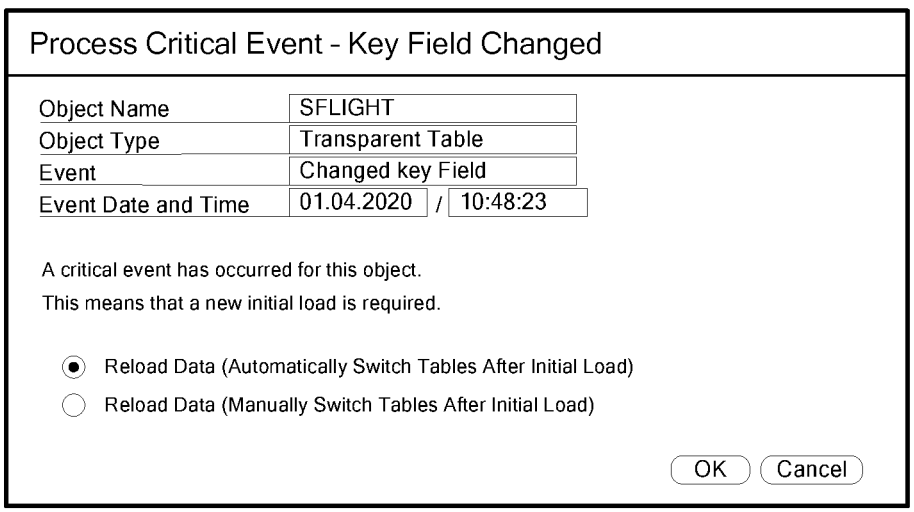
FIG. 9 shows a dialog window to receive user actions corresponding to a maintenance event according to some embodiments.

For example, FIG. 9 shows dialog 900 which may be presented to a user if the user selects "Process Event" in the second displayed record of user interface 800. Dialog 900 provides additional information regarding the event and allows the user to select one of two solutions. Specifically, the event type Key Field Changed is deemed Critical because changing the key field of the source object SFLIGHT results in dropping of corresponding triggers in the source system and cessation of data replication with respect to the source object. Accordingly, both presented solutions involve reloading the source table into the target table.

As described in commonly-assigned U.S. patent application Ser. No. 16/851,271, filed Apr. 17, 2020, reloading of a source table may include, in some embodiments, maintaining a pre-reload target table in the target system while the source table is being reloaded into another table of the target system. The pre-reload target table may be accessed by a client system during the reload into the other table. Once the reload is complete, the client system is redirected to access the newly-reloaded table.

Returning to dialog 900, the currently-selected solution switches the target table from the now-current target table to the reloaded target table once reloading is complete. The other (non-selected) solution requires user intervention before such a switch is made. The user may also select the Cancel control of dialog 900 to allow the event to remain unresolved.

Figure 10:
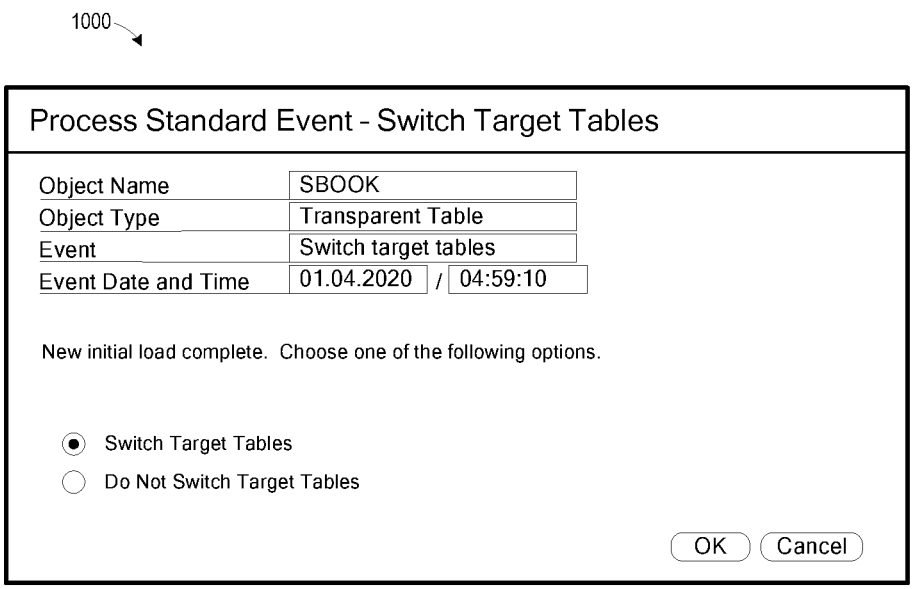
FIG. 10 shows a dialog window to receive user actions corresponding to a maintenance event according to some embodiments.

Dialog 1000 of FIG. 10 may be presented to a user if the user selects "Process Event" in the third displayed record of user interface 800. Dialog 1000 allows the user to instruct switching of target tables after a source table has been reloaded in the target system. Accordingly, the Switch Target Tables event type of dialog 1000 arises subsequent to user selection of "Reload Data (Manually Switch Tables After Initial Load)" in a Key Field Changed dialog such as dialog 900.

Figure 11:
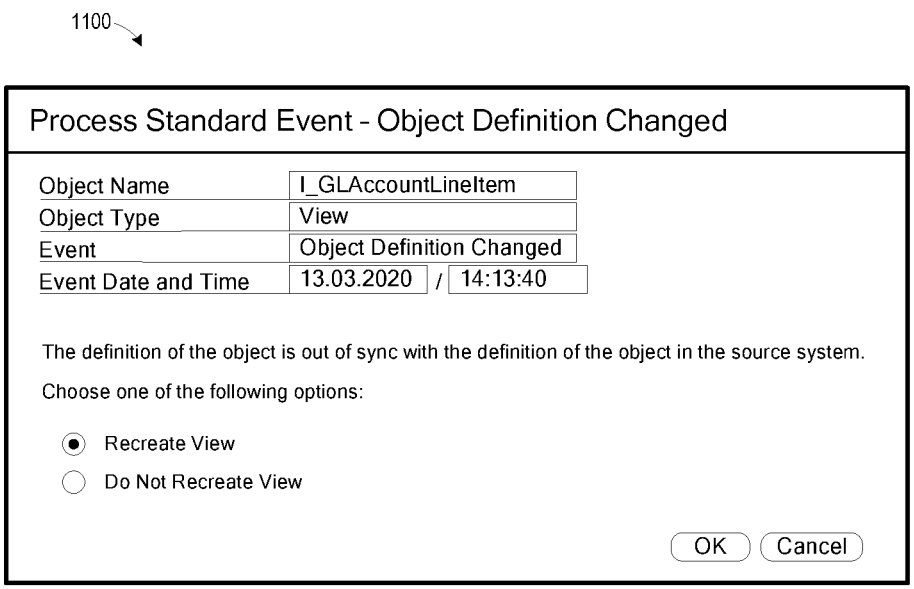
FIG. 11 shows a dialog window to receive user actions corresponding to a maintenance event according to some embodiments.

Dialog 1100 of FIG. 11 may be presented to a user if the user selects "Process Event" in the fourth displayed record of user interface 800. Dialog 1100 indicates that the definition of a View object in the source system has changed. Dialog 1100 therefore allows the user to instruct the replication system to recreate the view or not recreate the view in the target system. The user may decide to not recreate the view if the change to the source object (e.g., remove a field, add a field) is not relevant to the use oft the replicated view in the target system.

Figure 12:
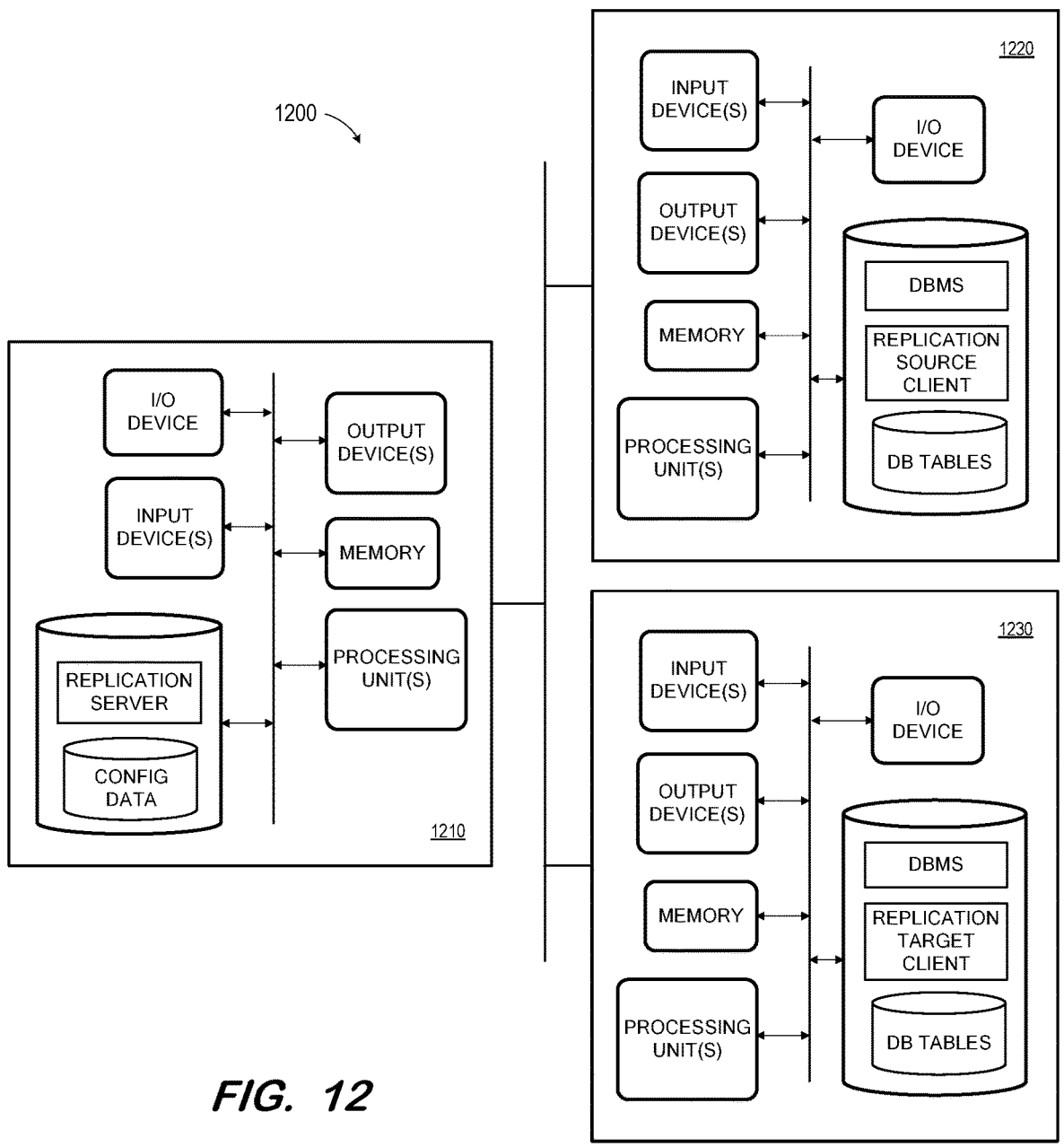
FIG. 12 is a block diagram of computing devices comprising a replication architecture for according to some embodiments.

FIG. 12 is a block diagram of system 1200 according to some embodiments. System 1200 includes replication system 1210, which may comprise an implementation of replication system 110 or 310. Similarly, source system 1220 may comprise an implementation of source system 120 or 320 and target system 1230 may comprise an implementation of target system 130 or 330. According to some embodiments, replication system 1210 may communicate simultaneously with many source systems and target systems to perform replication of objects as specified by configuration information, and to identify corresponding maintenance events which may be resolved as described herein. Each of systems 1210, 1220 and 1230 may comprise a general-purpose computing apparatus and may execute program code using processing unit(s) to perform any of the functions described herein. Each of systems 1210, 1220 and 1230 may include other unshown elements according to some embodiments.

All data storage mentioned herein may be provided via combinations of magnetic storage devices (e.g., hard disk drives and flash memory), optical storage devices, Read Only Memory (ROM) devices, etc., while volatile memory may comprise Random Access Memory (RAM), Storage Class Memory (SCM) or any other fast-access memory.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a memory storing processor-executable process steps;
   a processing unit to execute the processor-executable process steps to cause the system to:
      load data of a plurality of source objects of a source system into a corresponding plurality of target objects of a target system based on a replication configuration;
      detect changes to data of the plurality of source objects;
      replicate the data changes to corresponding ones of the plurality of target objects; and
   during the detection of changes to data and the replication of the data changes:
      detect a first change to a first source object;
      identify a first maintenance event based on the detected first change;
      determine a first one or more solutions to resolve the first maintenance event;
      present the first maintenance event and the first one or more solutions to resolve the first maintenance event to a user;
      receive an indication from the user of a first solution of the first one or more solutions to resolve the first maintenance event; and
      in response to the indication, execute the first solution.

2. The system according to claim 1, wherein the first maintenance event is associated with a first event type, and wherein determination of the first one or more solutions comprises:
   determination of a template associating the replication configuration and the first event type with the first one or more solutions.

3. The system according to claim 2, wherein determination of the first one or more solutions comprises:
   determination that no object-specific event handling data associates the source object and the first event type with a solution.

4. The system according to claim 1, wherein the first maintenance event is associated with a first event type, and wherein determination of the first one or more solutions comprises:
   determination of object-specific event handling data associating the source object and the first event type with the first one or more solutions.

5. The system according to claim 1, the processing unit to execute the processor-executable process steps to cause the system to:
   during the detection of changes to data and the replication of the data changes:
   detect a second change to a second source object;
   identify a second maintenance event based on the detected second change;
   determine a second one or more solutions to resolve the second maintenance event;
   present the second maintenance event and the second one or more solutions to resolve the second maintenance event to the user;
   receive a second indication from the user of a second solution of the second one or more solutions to resolve the second maintenance event; and
   in response to the second indication, execute the second solution.

6. The system according to claim 5, wherein the first maintenance event is associated with a first event type and the second maintenance event is associated with a second event type,
   wherein determination of the first one or more solutions comprises determination of a first template associating the replication configuration and the first event type with the first one or more solutions,
   and wherein determination of the second one or more solutions comprises determination that the first template associates the replication configuration and the second event type with the second one or more solutions.

7. The system according to claim 5, wherein the first maintenance event is associated with a first event type and the second maintenance event is associated with a second event type,
   wherein determination of the first one or more solutions comprises determination of a first template associating the replication configuration and the first event type with the first one or more solutions, and
   wherein determination of the first one or more solutions comprises determination of object-specific event handling data associating the second source object and the second event type with the second one or more solutions.

8. A computer-implemented method comprising:
   loading data of a plurality of source objects of a source database into a corresponding plurality of target objects of a target database based on a replication configuration;
   detecting changes to data of the plurality of source objects;
   replicating the data changes to corresponding ones of the plurality of target objects; and
   during the detection of changes to data and the replication of the data changes:
   detecting a first change to a first source object;
   identifying a first maintenance event based on the detected first change;
   determining a first one or more solutions to resolve the first maintenance event;
   presenting the first maintenance event and the first one or more solutions to resolve the first maintenance event to a user;
   receiving an indication from the user of a first solution of the first one or more solutions to resolve the first maintenance event; and
   in response to the indication, executing the first solution.

9. The method according to claim 8, wherein the first maintenance event is associated with a first event type, and wherein determining the first one or more solutions comprises:
   determining a template associating the replication configuration and the first event type with the first one or more solutions.

10. The method according to claim 9, wherein determining the first one or more solutions comprises:
    determining that no object-specific event handling data associates the source object and the first event type with a solution.

11. The method according to claim 8, wherein the first maintenance event is associated with a first event type, and wherein determining the first one or more solutions comprises:
    determining object-specific event handling data associating the source object and the first event type with the first one or more solutions.

12. The method according to claim 8, further comprising during the detection of changes to data and the replication of the data changes:
    detecting a second change to a second source object;
    identifying a second maintenance event based on the detected second change;
    determining a second one or more solutions to resolve the second maintenance event;
    presenting the second maintenance event and the second one or more solutions to resolve the second maintenance event to the user;
    receiving a second indication from the user of a second solution of the second one or more solutions to resolve the second maintenance event; and
    in response to the second indication, executing the second solution.

13. The method according to claim 12, wherein the first maintenance event is associated with a first event type and the second maintenance event is associated with a second event type,
    wherein determining the first one or more solutions comprises determining a first template associating the replication configuration and the first event type with the first one or more solutions,
    and wherein determining the second one or more solutions comprises determining that the first template associates the replication configuration and the second event type with the second one or more solutions.

14. The method according to claim 12, wherein the first maintenance event is associated with a first event type and the second maintenance event is associated with a second event type,
    wherein determining the first one or more solutions comprises determining a first template associating the replication configuration and the first event type with the first one or more solutions, and wherein determining the first one or more solutions comprises determining of object-specific event handling data associating the second source object and the second event type with the second one or more solutions.

15. A system comprising:
a source database system comprising a first processing unit and a first non-transitory computer-readable medium storing a first source database table;
a target database system comprising a second processing unit and a second non-transitory computer-readable medium;
a replication system comprising a third processing unit and a third non-transitory computer-readable medium, the replication system to:
detect data changes to the first source database table;
replicate the data changes to a target database table of the target database system based on a replication configuration; and
during the detection of data changes and the replication of the data changes:
detect a first change to the first source database table;
identify a first maintenance event based on the detected first change;
determine a first one or more solutions to resolve the first maintenance event;
present the first maintenance event and the first one or more solutions to resolve the first maintenance event to a user;
receive an indication from the user of a first solution of the first one or more solutions to resolve the first maintenance event; and
in response to the indication, execute the first solution.

16. The system according to claim 15, wherein the first maintenance event is associated with a first event type, and wherein determination of the first one or more solutions comprises:
determination of a template associating the replication configuration and the first event type with the first one or more solutions.

17. The system according to claim 15, wherein the first maintenance event is associated with a first event type, and wherein determination of the first one or more solutions comprises:
determination of object-specific event handling data associating the source database table and the first event type with the first one or more solutions.

18. The system according to claim 15, the first non-transitory computer-readable medium storing a second source database table, and the replication system to:
during the detection of data changes and the replication of the data changes:
detect a second change to a second source database table;
identify a second maintenance event based on the detected second change;
determine a second one or more solutions to resolve the second maintenance event;
present the second maintenance event and the second one or more solutions to resolve the second maintenance event to the user;
receive a second indication from the user of a second solution of the second one or more solutions to resolve the second maintenance event; and
in response to the second indication, execute the second solution.

19. The system according to claim 18, wherein the first maintenance event is associated with a first event type and the second maintenance event is associated with a second event type,
wherein determination of the first one or more solutions comprises determination of a first template associating the replication configuration and the first event type with the first one or more solutions,
and wherein determination of the second one or more solutions comprises determination that the first template associates the replication configuration and the second event type with the second one or more solutions.

20. The system according to claim 18, wherein the first maintenance event is associated with a first event type and the second maintenance event is associated with a second event type,
wherein determination of the first one or more solutions comprises determination of a first template associating the replication configuration and the first event type with the first one or more solutions, and
wherein determination of the first one or more solutions comprises determination of object-specific event handling data associating the second source database table and the second event type with the second one or more solutions.

* * * * *